United States Patent
Roux

(10) Patent No.: US 10,788,434 B2
(45) Date of Patent: Sep. 29, 2020

(54) METHOD FOR INSPECTING AN OBJECT OPTICALLY

(71) Applicant: VIT, Saint-Egreve (FR)

(72) Inventor: Romain Roux, Saint-Egreve (FR)

(73) Assignee: VIT, Saint-Egreve (FR)

( * ) Notice: Subject to any disclaimer, the term of this patent is extended or adjusted under 35 U.S.C. 154(b) by 26 days.

(21) Appl. No.: 16/322,357

(22) PCT Filed: Jul. 12, 2017

(86) PCT No.: PCT/FR2017/051923
§ 371 (c)(1),
(2) Date: Jan. 31, 2019

(87) PCT Pub. No.: WO2018/024957
PCT Pub. Date: Feb. 8, 2018

(65) Prior Publication Data
US 2019/0178817 A1 Jun. 13, 2019

(30) Foreign Application Priority Data

Aug. 3, 2016 (FR) .................................. 16 57518

(51) Int. Cl.
| | |
|---|---|
| *G01N 21/956* | (2006.01) |
| *G01B 11/25* | (2006.01) |
| *G01N 21/88* | (2006.01) |
| *G01B 11/22* | (2006.01) |

(52) U.S. Cl.
CPC ....... *G01N 21/95684* (2013.01); *G01B 11/22* (2013.01); *G01B 11/25* (2013.01); *G01N 21/8851* (2013.01); *G01N 2021/8893* (2013.01)

(58) Field of Classification Search
CPC .................. G01B 11/22; G01B 11/25; G01N 2021/8893; G01N 21/8851; G01N 21/95684
USPC .................................................. 356/600–640
See application file for complete search history.

(56) References Cited

FOREIGN PATENT DOCUMENTS

| DE | 102015109843 A1 | 12/2015 |
|---|---|---|
| EP | 3043248 A1 | 7/2016 |
| JP | 2006267018 A | 10/2006 |

(Continued)

OTHER PUBLICATIONS

International Search Report for PCT/FR2017/051923 dated Nov. 22, 2017, 2 pages.

(Continued)

*Primary Examiner* — Tri T Ton
(74) *Attorney, Agent, or Firm* — Moreno IP Law LLC

(57) ABSTRACT

A method of assisting the optical inspection of an object includes the steps of: determining a first three-dimensional image of the object; determining a first color or grey level two-dimensional image of the object; determining at least one first window (F1) on the first two-dimensional image surrounding a possible defect of the object from the first three-dimensional image and/or from the first two-dimensional image; determining a second two-dimensional image corresponding to the first two-dimensional image outside of the first window and corresponding to a first depth map of the object in the first window; and determining a second three-dimensional image (I3D') corresponding to the first three-dimensional image having the second two-dimensional image applied thereon.

15 Claims, 2 Drawing Sheets

(56) References Cited

FOREIGN PATENT DOCUMENTS

KR        20150017421 A        2/2015

OTHER PUBLICATIONS

Written Opinion of the Intenational Search Authority for International Application No. PCT/FR2017/051923 dated Nov. 22, 2017, 7 pages.

METHOD FOR INSPECTING AN OBJECT OPTICALLY

CROSS-REFERENCE TO RELATED APPLICATION

The present patent application claims the priority benefit of French patent application FR16/57518 which is herein incorporated by reference.

FIELD

The present invention generally concerns optical inspection installations particularly comprising three-dimensional image determination systems intended for the on-line analysis of objects, particularly of electronic circuits. The invention more particularly concerns optical inspection installations comprising digital cameras.

BACKGROUND

An optical inspection installation is generally used to verify the sound condition of an object, for example, an electronic circuit, before it is released to the market. The optical inspection installation may provide different types of images of the object which are automatically analyzed by a computer and/or by an operator to search for possible defects. An example of image is a color two-dimensional image, or 2D image, of the object, for example, a top view of the object. Another example of image is a three-dimensional image of the object, or 3D image. A 3D image of an object corresponds to a cloud of points, for example, several million points, of at least a portion of the external surface of the object, where each point of the surface is located by its coordinates determined with respect to a three-dimensional space reference system. Another example of image is a depth map, also called "z-map", which may be represented by a 2D image then called "heat map" where the color of each pixel depends on the height of the corresponding point of the object.

The optical inspection installation generally comprises a processing unit capable of performing an automatic analysis of the images of the object to search for possible defects. This is for example performed by comparing the image of the object with a reference image. In the case of an electronic circuit comprising, for example, a printed circuit having electronic components affixed thereon, the images of the electronic circuit may be used, in particular, to inspect the sound condition of the solders of the electronic components on the printed circuit.

In certain cases, a confirmation may be requested from an operator. To assist the operator, an image or a plurality of images of the object may be displayed on a display screen, particularly the 3D image of the object, the color 2D image of the object, or the depth map of the object.

However, even if the processing unit can indicate to the operator, on each displayed image, the image portion where a possible defect may be detected, it may be difficult for the operator to validate or not the presence of defects by the sole observation of the image. Additional operations, for example, the determination of cross-section views of the object, may then be necessary for the operator to validate or not the presence of defects. A disadvantage is that the duration of the optical inspection method is increased.

SUMMARY

An object of an embodiment is to at least partly overcome the disadvantages of the previously-described optical inspection methods and optical inspection installations.

Another object of an embodiment is to assist an operator during a method of optical inspection of an object.

Another object of an embodiment is that the duration of the method of optical inspection of the object is decreased.

Thus, an embodiment provides a method of assisting the optical inspection of an object comprising the steps of:
   determining a first three-dimensional image of the object;
   determining a first color or grey level two-dimensional image of the object;
   determining at least one first window on the first two-dimensional image surrounding a possible defect of the object from the first three-dimensional image and/or from the first two-dimensional image;
   determining a second two-dimensional image corresponding to the first two-dimensional image outside of the first window and corresponding to a first depth map of the object in the first window; and
   determining a second three-dimensional image corresponding to the first three-dimensional image having the second two-dimensional image applied thereon.

According to an embodiment, the method comprises dis-playing the second three-dimensional image on a screen.

According to an embodiment, the method comprises the validation or the lack of validation by an operator of the possible defect by means of a man/machine interface.

According to an embodiment, the first depth map is a color map comprising a set of pixels, each pixel having a color which depends on the height of the point of the first three-dimensional image corresponding to said pixel.

According to an embodiment, the first depth map implements a color range, among which a first color for the maximum value of the height of the points of the first three-dimensional image in the first window and a second color for the minimum value of the height of the points of the first three-dimensional image in the first window.

According to an embodiment, the first and second colors are determined by an operator.

According to an embodiment, the first two-dimensional image is a top view of the object.

According to an embodiment, the method further comprises the steps of:
   determining a second window on the first two-dimensional image surrounding a portion of the object having the same shape as in the first window in the absence of the possible defect; and
   determining the second two-dimensional image corresponding to the first two-dimensional image outside of the first window and of the second window and corresponding to the first depth map of the object in the first window and to a second depth map of the object in the second window.

According to an embodiment, the method successively comprises:
   determining third windows on the first two-dimensional image; and
   searching for the possible defect in each third window, the first window corresponding to the third window where the possible defect has been detected.

According to an embodiment, the third windows are determined automatically or by an operator.

According to an embodiment, a possible defect is detected when the height of at least one point of the first three-dimensional image in the third window does not belong to a height interval.

According to an embodiment, the object is an electronic circuit.

An embodiment also provides an installation of optical inspection of an object comprising a system of determination of a first three-dimensional image of the object and of a first color or grey level two-dimensional image of the object, the installation further comprising a processing unit capable of determining at least one possible defect of the object from the first three-dimensional image and/or from the first two-dimensional image, of determining a first window on the first two-dimensional image surrounding the possible defect, of determining a second two-dimensional image corresponding to the first two-dimensional image outside of the first window and corresponding to a depth map of the object in the first window, and of determining a second three-dimensional image corresponding to the first three-dimensional image having the second two-dimensional image applied thereon.

According to an embodiment, the installation comprises at least one camera and one projector capable of projecting structured images on the object.

According to an embodiment, the installation further comprises a display screen for the display of the third three-dimensional image.

BRIEF DESCRIPTION OF THE DRAWINGS

The foregoing and other features and advantages will be discussed in detail in the following non-limiting description of specific embodiments in connection with the accompanying drawings, among which.

DETAILED DESCRIPTION OF THE PRESENT EMBODIMENTS

Figure 1:
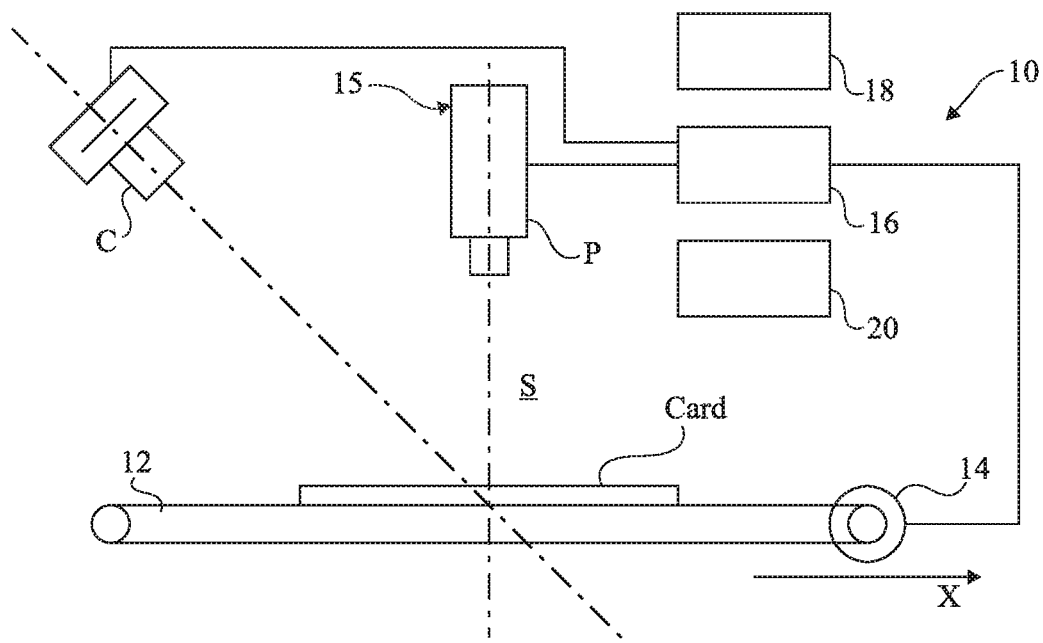
FIG. 1 partially and schematically shows an embodiment of an electronic circuit optical inspection installation.

For clarity, the same elements have been designated with the same reference numerals in the various drawings and, further, the various drawings are not to scale. The terms "approximately", "substantially", and "in the order of" are used herein to designate a tolerance of plus or minus 10%, preferably of plus or minus 5%, of the value in question. Further, only those elements which are useful to the understanding of the present description have been shown and will be described. In the present description, the term color or grey level two-dimensional image designates a two-dimensional image of the object representative of the color or of the grey level of the object.

FIG. 1 very schematically shows an electronic circuit optical inspection installation 10. The term electronic circuit indifferently designates an assembly of electronic components interconnected via a support, the support alone used to perform such an interconnection without the electronic components, or the support without the electronic components but provided with means for attaching the electronic components. As an example, the support is a printed circuit and the electronic components are fastened to the printed circuit by solder joints obtained by heating solder paste blocks. In this case, the term electronic circuit indifferently designates the printed circuit alone (with no electronic components or solder paste blocks), the printed circuit provided with the solder paste blocks and without electronic components, the printed circuit provided with the solder paste blocks and with the electronic components before the heating operation, or the printed circuit provided with the electronic components fastened to the printed circuit by the solder joints.

Each electronic circuit Card is placed on a conveyor 12, for example, a planar conveyor. Conveyor 12 is capable of displacing circuit Card along a direction X, for example, a horizontal direction, to take it to a region of the optical inspection installation, called scene S, where images of circuit Card may be acquired. As a variation, the displacement direction of circuit Card may be a horizontal direction perpendicular to direction X shown in FIG. 1. As an example, conveyor 12 may comprise an assembly of straps and of rollers driven by a rotating electric motor 14. As a variation, conveyor 12 may comprise a linear motor displacing a carriage supporting electronic circuit Card. Circuit Card for example corresponds to a rectangular card having a length and a width varying from 50 mm to 550 mm.

Optical inspection installation 10 comprises a system 15 for determining a 3D image of electronic circuit Card. A 3D image of an electronic circuit corresponds to a cloud of points, for example, of several million points, of at least a portion of the external surface of the electronic circuit, where each point of the surface is located by its coordinates (x, y, z) determined with respect to a three-dimensional space reference system R (Ox, Oy, Oz). As an example, plane (Ox, Oy) corresponds to a reference plane of optical inspection installation 10, for example parallel to the plane containing the upper surface of the printed circuit. Direction (Oz) is perpendicular to plane (Ox, Oy). In the present description, the term 2D image designates a digital image acquired by a camera and corresponding to a pixel array. In the following description, unless otherwise indicated, the term image refers to a two-dimensional image.

According to an embodiment, system 15 is capable of determining a 3D image of circuit Card by projection of images, for example, fringes, on the circuit to be inspected. System 15 may comprise an image projection device P comprising at least one projector, a single projector P being shown in FIG. 1. When a plurality of projectors P are present, projectors P may be substantially aligned along a direction perpendicular to direction X. System 15 further comprises an image acquisition device C comprising at least one digital camera, a single camera C being shown in FIG. 1. When a plurality of cameras C are present, cameras C may be substantially aligned, for example, in groups of cameras, preferably along a direction perpendicular to direction X, and/or be arranged on either side of protector(s) P. Projector P and camera C are coupled to a computer image processing unit 16. Processing unit 16 may comprise a computer or a microcontroller comprising a processor and a non-volatile memory having instruction sequences stored therein, their execution by the processor enabling processing unit 16 to carry out the desired functions. As a variation, processing unit 16 may correspond to a dedicated electronic circuit. Electric motor 14 may further be controlled by processing unit 16.

The means for controlling previously-described conveyor 12, camera C, and projector P of optical acquisition installation 10 are within the abilities of those skilled in the art and are not described in further detail.

In the present embodiment, 3D image determination system 15 is capable of determining a 3D image of circuit Card by projection of images, for example, fringes, on the circuit to be inspected. In the present embodiment, camera C and projector P are fixed on acquisition of the 2D images used to determine the 3D image and electronic circuit Card is displaced with respect to camera C and to projector P via conveyor 12. As a variation, electronic circuit Card fixed on acquisition of the 2D images used to determine the 3D image and camera C and projector P are displaced with respect to electronic circuit Card by any adapted conveying device.

According to another embodiment, 3D image determination system 15 comprises a laser scanner.

Optical inspection installation 10 comprises a display screen 18 coupled to processing unit 16 and on which processing unit 16 is capable of displaying 2D images or a representation of a 3D image.

Optical inspection installation 10 comprises a man/machine interface 20 coupled to processing unit 16 and for example comprising a keyboard, a touch screen, possibly confounded with display screen 18, a mouse, a microphone, and/or control knobs. An operator may transmit instructions to processing unit 16 by means of interface 20.

Optical inspection installation 10 is further capable of supplying a 2D image of electronic circuit Card, called texture image hereafter, for example, a top view of electronic circuit Card. This view may correspond to an image acquired by camera C or by another camera, not shown, or to a combination of a plurality of two-dimensional images acquired by camera C or by a plurality of cameras. It may be a grey level or color image of electronic circuit Card. The texture image corresponds to a pixel array, each pixel being defined by a digital value corresponding to a grey level or to a color code which depends on the color of the corresponding point of electronic circuit Card.

Optical inspection installation 10 is further capable of supplying a depth map of at least a portion of electronic circuit Card. The depth map is a 2D image, for example, a top view of electronic circuit Card, representing a heat map of electronic circuit Card where the color of each pixel of the image located by coordinates (x, y) depends on the z coordinate of the point of the 3D image of electronic circuit Card at coordinates (x, y). The colors of the pixels of the depth map are selected from a color chart which matches a single color with each value of the z coordinate. The heat map may be monochrome, for example, with colors varying from black to white. Preferably, a specific color gradient may be used, for example, colors successively transiting through blue, cyan, green, yellow, and red. In the present description, the term maximum color designates the color in the heat map corresponding to the maximum value of the z coordinate and the term minimum color designates the color in the heat map corresponding to the minimum value of the z coordinate. The minimum and maximum colors may be defined by the operator, for example, based on manufacturing tolerances. The colors of the depth map may be coded in the RVB coding computer system. In RVB coding, each color is coded by three values associated with the primary colors, that is, red, green, and blue. For each primary color, the value can be expressed in an interval from 0 to maximum, for example, 1, 100%, or 255.

Figure 2:
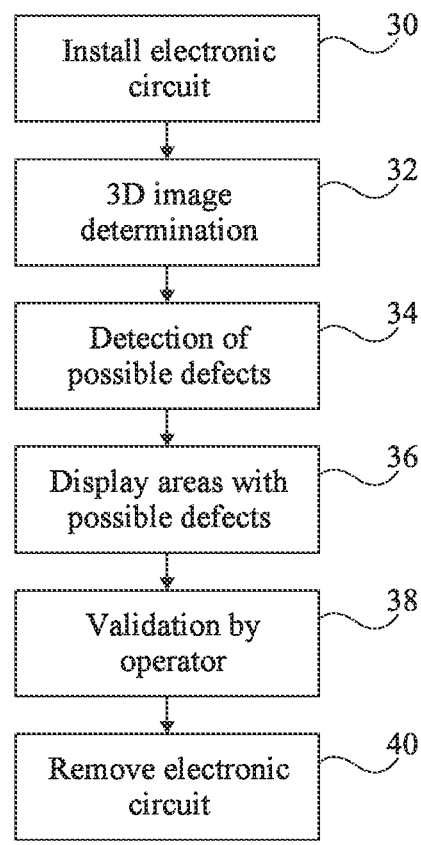
FIG. 2 is a block diagram of an embodiment of an optical inspection method implemented by the installation of FIG. 1.

FIG. 2 shows in the form of a block diagram an embodiment of a method of optical inspection of an electronic circuit implemented by optical inspection installation 10 of FIG. 1. The method comprises next successive steps 30, 32, 34, 36, 38, and 40.

At step 30, electronic circuit Card to be inspected is placed on scene S of optical inspection installation 10, for example, by means of conveyor 12.

At step 32, optical inspection installation 10 deter-mines at least one 3D image of electronic circuit Card. Optical inspection installation 10 may further determine a texture image of circuit Card and apply the texture image to the 3D image to display a color 3D image on screen 18. The application of the texture image on the 3D image may be performed by the implementation of a known virtual view synthesis algorithm. There mainly exist two families of algorithms which enable to synthesize a virtual view of a scene from color texture information and from three-dimensional information. The first family gathers so-called ray tracing algorithms, which are more calculation-intensive but enable to obtain more realistic virtual views. The second family gathers so-called "rasterizing" algorithms, which are less calculation-intensive but are coarser. Examples of such algorithms are described in the work entitled "Fundamentals of Computer Graphics" of Peter Shirley (Editions Tayler & Francis, 2005, ISBN 1568812698), particularly in chapters 3 and 10.

Figure 3:
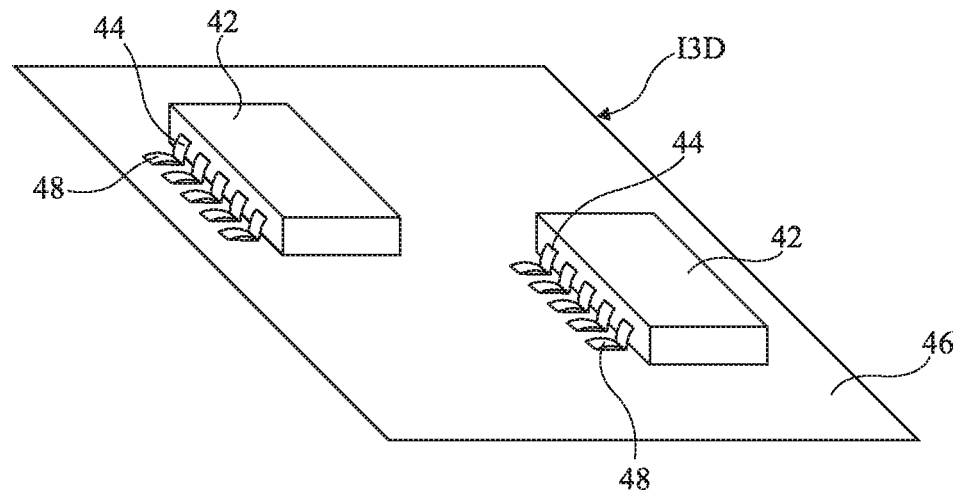
FIG. 3 partially and schematically shows an example of a three-dimensional image of an electronic circuit.

FIG. 3 is a simplified partial perspective view of an example of a three-dimensional image I3D of an electronic circuit as it can be displayed on screen 18. Image I3D shows two integrated circuits 42 comprising tabs 44 fastened to the upper surface of a printed circuit 46 by solder pads 48.

At step 34, processing unit 16 is capable of detecting the presence of possible defects on electronic circuit Card by an analysis of the acquired 3D image and/or 2D images of electronic circuit Card. Processing unit 16 may implement any type of algorithms for the detection of possible defects. As an example, for the inspection of the state of the solders of the electronic components on the printed circuit, processing unit 16 may compare a 3D image of the electronic circuit on which solder paste has been deposited with a previously-determined 3D image of the printed circuit in the absence of solder paste, for example, to obtain a 3D image representative of the differences between the 3D images of the printed circuit with or without solder paste. The analysis of the 3D comparison image especially enables to determine whether the solders of the electronic components are satisfactory.

At step 36, processing unit 16 determines, from the 3D image of electronic circuit Card, a modified 3D image where at least one area where a possible defect has been detected is highlighted. According to an embodiment, processing unit 16 determines for each possible defect a window in the texture image which contains the area where the possible defect is detected. Each window may correspond to a circle or to any polygonal shape, for example, a square or a rectangle. The window is smaller than the dimensions of the texture image. According to an embodiment, each window contains less than 20% of the pixels of the texture image. Each window may be determined as the set of pixels around the area where a possible defect has been detected and for which the variation of coordinate z of the points of the window varies within a predetermined range.

According to another embodiment, the operator manually defines the windows on which processing unit 16 should perform specific tests also defined by the operator. An example of test is to verify the inclusion of the height of a pixel of the z-map within a height interval defined by the operator, for example, based on manufacturing tolerances. Such an automatic or supervised definition of windows occurs during a phase called of programming of a new electronic board reference, of a new product. A program comprises digitally describing a set of windows associated with processings. Such processings may for example be histogram determination methods, tests of inclusion within an envelope along a cross-section or profile, measurements of the similarity between the image originating from the acquisition system and a reference image. The processings (and thus the definition of the manufacturing tolerances) may then be stored in a "database" or "component library" to accelerate the programming step for future products on the already-processed components, but also to apply any modification of the processing library to existing programs.

To ease decision making by an operator, when a possible defect is detected at a location of the electronic circuit, processing unit 16 may further determine at least one window at a location where the electronic circuit structure is similar to that where the defect has been detected, but where no defect has been detected. Preferably, processing unit 16 determine a window at each location where the electronic circuit structure is similar to that where the defect has been detected, but where no defect has been detected. The window defines a sub-range of coordinates (x, y) corresponding to pixels of the texture image and to points of the 3D image. The windows may also originate from a manual predefinition performed by the operator, who may for example position then on the tabs of a component (for the detection of the tabs which are not connected to the rest of the electronic board) or on the top of a package of a component (for the detection of a lack of co-planarity between the component and the rest of the electronic board).

In each window, processing unit 16 determines a local depth map. To achieve this, processing unit 16 determines the minimum and maximum values taken by coordinate z of the 3D image for the points of coordinates (x, y) contained in the window. The local maximum value of the z coordinate in the window is generally smaller than the maximum value of the z coordinate over the entire 3D image, called general maximum value. The local minimum value of the z coordinate in the window is generally greater than the minimum value of the z coordinate over the entire 3D image, called general minimum value. In each window, processing unit 16 determines a local heat map by associating with the maximum color the local maximum value of the z coordinate over the window and by associating with the minimum color the minimum value of the z coordinate over the window. Processing unit 16 determines a new 2D image which corresponds, in each window, to a local depth map and which corresponds, outside of the windows, to the texture image. Processing unit 16 applies the new 2D image on the 3D image. The 3D image thus modified is then displayed on screen 18. The application of the new 2D image on the 3D image may be performed by the previously-described virtual view synthesis algorithms.

According to the embodiment where the operator has defined manufacturing tolerances, the colors of the heat map corresponding to the z-map may be adjusted for each pixel on the manufacturing tolerances to for example code the "acceptable" character of the inspected electronic board with usual colors of success or failure to a test, that is, color green when the z coordinate is included within the tolerance interval, orange when the z coordinate is close to one of the limits of the tolerance interval (for example, less than 50 µm away from one of the limits), and red when the z coordinate is no longer included within manufacturing tolerances.

Figure 4:
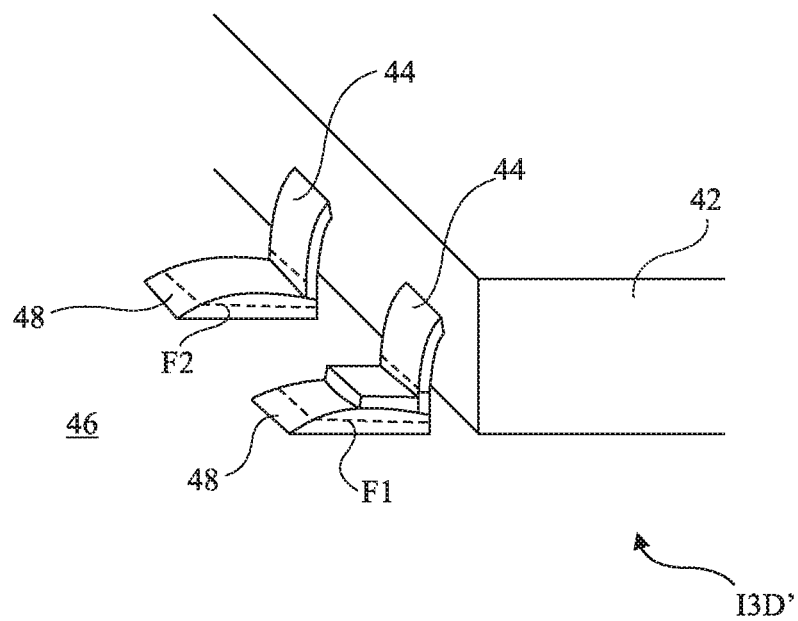
FIG. 4 is a detail view of the three-dimensional image of FIG. 3 after modification on implementation of the optical inspection method illustrated in FIG. 2.

FIG. 4 shows an enlarged detail view of an example of a modified 3D image I3D' obtained from image I3D of FIG. 3. As an example, a first window F1 located at the level of a solder pad 48 where a possible defect has been detected has been shown in dotted lines and a second window F2 located at the level of a solder pad 48 where no defect has been detected has been shown in dotted lines.

At step 38, for each possible defect detected by processing unit 16, the operator determines whether electronic circuit Card is accepted or refused, for example by means of interface 20. The depth map locally applied on the 3D image in each window where a possible defect is detected enables an operator to rapidly determine the real presence or not of a defect in the window. Indeed, since the local depth map is applied to a small portion of the 3D image, the color range of the local depth map corresponds to a range of variation of the z coordinate which is smaller than the total variation range of the z coordinate over the entire 3D image. Thereby, the variations of the z coordinate are highlighted by the local depth map. The operator can thus easily determine whether the variations of the z coordinate in the window where a possible defect has been detected are normal or not. Such a detection may be eased when at least two local depth maps are applied to the 3D image, the first local depth map being located in a first window where a possible defect has been detected and the second local depth map being located in a second window where no possible defect has been detected but where the structure of the electronic circuit is similar to that in the first window. The operator can then easily determine whether a defect is really present by visually comparing the two local depth maps. Such a detection may also be eased when the heat map codes the distance between a pixel of the processing window and the tolerances predefined by the operator.

At step 40, electronic circuit Card is removed from scene S.

Specific embodiments have been described. Various alterations and modifications will occur to those skilled in the art. In particular, although previously-described system 10 is capable of implementing a method of determining a three-dimensional image of an object by image projection on the object, it should be clear that the three-dimensional image determination method may be different, for example, implementing interferometric methods. Further, although an optical inspection installation has been described for the inspection of electronic circuits, it should be clear that the optical inspection installation may be used for the optical inspection of other objects.

What is claimed is:

1. A method of assisting the optical inspection of an object, comprising the steps of:
   determining a first three-dimensional image of the object;
   determining a first color or grey level two-dimensional image of the object;
   determining at least one first window on the first two-dimensional image surrounding a possible defect of the object from the first three-dimensional image and from the first two-dimensional image;
   determining a first depth map of the portion of the object in the first window;
   determining a second two-dimensional image corresponding to the first two-dimensional image outside of the first window and corresponding to the first depth map of the object in the first window; and
   determining a second three-dimensional image corresponding to the first three-dimensional image having the second two-dimensional image applied thereon.

2. The method of claim 1, comprising displaying the second three-dimensional image on a screen.

3. The method of claim 1, comprising the validation or the lack of validation by an operator of the possible defect by means of a man/machine interface.

4. The method of claim 1, wherein the first depth map is a color map comprising a set of pixels, each pixel having a color which depends on the height of the point of the first three-dimensional image corresponding to said pixel.

5. The method of claim 4, wherein the first depth map implements a color range, among which a first color for the maximum value of the height of the points of the first three-dimensional image in the first window and a second color for the minimum value of the height of the points of the first three-dimensional image in the first window.

6. The method of claim 5, wherein the first and second colors are determined by an, operator.

7. The method of claim 1, wherein the first two-dimensional image is a top view of the object.

8. The method of claim 1, further comprising the steps of:
determining a second window on the first two-dimensional image surrounding a portion of the object having the same shape as M the first window in the absence of the possible defect; and
determining the second two-dimensional image corresponding to the first two-dimensional image outside of the first window and of the second window and corresponding to the first depth map of the object in the first window and to a second depth map of the object in the second window.

9. The method of claim 1, successively comprising:
determining third windows on the first two-dimensional image; and
searching for the possible defect in each third window, the first window corresponding to the third window where the possible defect has been detected.

10. The method of claim 9, wherein the third windows are determined automatically or by an operator.

11. The method of claim 9, wherein a possible defect is detected when the height of at least one point of the first three-dimensional image in the third window which does not belong to a height interval.

12. The method of claim 1, wherein the object is an electronic circuit.

13. An installation of optical inspection of an object comprising a system of determination of a first three-dimensional image of the object and of a first color or grey level two-dimensional image of the object, the installation further comprising a processing unit capable of determining at least one possible defect of the object from the first three-dimensional image and from the first two-dimensional image, of determining a first window on the first two-dimensional image surrounding the possible defect, of determining a first depth map of the portion of the object in the first window, of determining a second two-dimensional image corresponding to the first two-dimensional image outside of the first window and corresponding to a depth map of the object in the first window, and of determining a second three-dimensional image corresponding to the first three-dimensional image having the second two-dimensional image applied thereon.

14. The optical inspection installation of claim 13, comprising at least one camera and one projector capable of projecting structured images on the object.

15. The optical inspection installation of claim 13, further comprising a display screen to display the third three-dimensional image.

* * * * *